US012580723B2

(12) United States Patent
Zhou et al.

(10) Patent No.: US 12,580,723 B2
(45) Date of Patent: Mar. 17, 2026

(54) METHOD AND APPARATUS OF DESKEW PROCESS FOR A CIRCUITRY, COMPUTER STORAGE MEDIUM, AND TERMINALS

(71) Applicant: GOWIN Semiconductor Corporation, GuangZhou (CN)

(72) Inventors: Qiang Zhou, GuangZhou (CN); Ruixia Bai, GuangZhou (CN); Xiaozhi Lin, GuangZhou (CN); Qiming Wu, GuangZhou (CN); Yu Sun, GuangZhou (CN); Jia Ding, GuangZhou (CN); Xu Ding, GuangZhou (CN)

(73) Assignee: GOWIN Semiconductor Corporation, GuangZhou (CN)

( * ) Notice: Subject to any disclaimer, the term of this patent is extended or adjusted under 35 U.S.C. 154(b) by 0 days.

(21) Appl. No.: 18/661,488

(22) Filed: May 10, 2024

(65) Prior Publication Data

US 2025/0184112 A1     Jun. 5, 2025

(51) Int. Cl.
H04L 7/00          (2006.01)
H04L 7/033         (2006.01)

(52) U.S. Cl.
CPC ............ H04L 7/0037 (2013.01); H04L 7/033 (2013.01)

(58) Field of Classification Search
CPC ... H04L 7/0016; H04L 7/0033; H04L 7/0037; H04L 7/0041; H04L 7/02; H04L 7/033; H04L 7/0331; H04L 7/0337
See application file for complete search history.

(56) References Cited

U.S. PATENT DOCUMENTS

| | | | | |
|---|---|---|---|---|
| 4,354,274 A | * | 10/1982 | Hughes | H03D 13/00 |
| | | | | 375/376 |
| 5,115,455 A | * | 5/1992 | Samaras | H04L 7/0338 |
| | | | | 375/362 |
| 6,078,623 A | * | 6/2000 | Isobe | G06F 1/10 |
| | | | | 713/400 |
| 6,329,858 B1 | * | 12/2001 | Sobue | H04L 7/0037 |
| | | | | 327/144 |
| 6,553,505 B1 | * | 4/2003 | Brown | H04L 7/046 |
| | | | | 713/401 |

(Continued)

*Primary Examiner* — James M Perez
(74) *Attorney, Agent, or Firm* — JW Law Group; James M. Wu

(57) ABSTRACT

A circuitry, method, computer storage medium, and terminal for deskew processing include: receiving data lanes, clock signal lanes, deskew control modules, and deskew modules. The receiving data lane receives input data signals, which are in alternating standard sequence. The clock signal lane receives input clock signals. The deskew control module is connected to the receiving data lane and is set to acquire the sample data obtained by sampling the data signal of the data signal lane by the clock signal of the clock signal lane with a preset duration, and determine the delay information based on the sample data. The deskew module is connected to the deskew control module and is set to adjust the phase offset of both the clock signal and the data signal based on the delay information. The embodiments of the present invention sample the data signal and determine the delay information by the deskew control module, adjust the phase offset by the delay information, simplifying the circuitry composition of phase calibration.

16 Claims, 6 Drawing Sheets

(56)                References Cited

U.S. PATENT DOCUMENTS

| | | | | |
|---|---|---|---|---|
| 6,580,304 B1* | 6/2003 | Rieven | H03H 11/26 | |
| | | | 327/158 | |
| 6,643,787 B1* | 11/2003 | Zerbe | G06F 13/4243 | |
| | | | 713/400 | |
| 6,654,897 B1* | 11/2003 | Dreps | G06F 13/4208 | |
| | | | 713/400 | |
| 6,952,431 B1* | 10/2005 | Dally | H03L 7/083 | |
| | | | 370/503 | |
| 7,102,446 B1* | 9/2006 | Lee | H03L 7/093 | |
| | | | 331/DIG. 2 | |
| 7,139,348 B1* | 11/2006 | Fu | H03L 7/0805 | |
| | | | 713/401 | |
| 7,209,531 B1* | 4/2007 | Katz | H04L 7/0338 | |
| | | | 370/517 | |
| 7,606,341 B2* | 10/2009 | Pereira | H04L 25/14 | |
| | | | 375/354 | |
| 8,989,249 B2* | 3/2015 | Zerbe | H04L 25/497 | |
| | | | 375/259 | |
| 9,191,187 B2* | 11/2015 | Shibasaki | H03L 7/24 | |
| 9,300,461 B2* | 3/2016 | Akita | H03L 7/0891 | |
| 9,329,623 B2* | 5/2016 | Vankayala | H03L 7/16 | |
| 9,330,741 B2* | 5/2016 | Song | G11C 7/1093 | |
| 9,379,880 B1* | 6/2016 | Xu | H04L 7/0337 | |
| 9,832,006 B1* | 11/2017 | Bandi | G06F 1/10 | |
| 10,931,269 B1* | 2/2021 | Sperling | H04L 7/0041 | |
| 11,095,294 B2* | 8/2021 | Wu | H03L 7/093 | |
| 11,115,176 B1* | 9/2021 | Goudarzi | G06F 13/4291 | |
| 11,216,022 B1* | 1/2022 | Liu | G06F 1/06 | |
| 11,424,905 B1* | 8/2022 | Musoll | G06F 13/4295 | |
| 11,614,770 B2* | 3/2023 | Liu | G06F 1/06 | |
| | | | 713/600 | |
| 11,729,030 B2* | 8/2023 | Tsai | H04L 25/14 | |
| | | | 375/262 | |
| 12,038,781 B2* | 7/2024 | Liu | G06F 1/06 | |
| 2002/0030522 A1* | 3/2002 | Nakamura | H03L 7/07 | |
| | | | 327/165 | |
| 2002/0087922 A1* | 7/2002 | Glenn | H04L 7/02 | |
| | | | 714/700 | |
| 2002/0154723 A1* | 10/2002 | Nakamura | H03L 7/0816 | |
| | | | 375/376 | |
| 2003/0002608 A1* | 1/2003 | Glenn | H04L 7/0337 | |
| | | | 375/355 | |
| 2003/0081709 A1* | 5/2003 | Ngo | H04L 7/00 | |
| | | | 375/362 | |
| 2003/0188234 A1* | 10/2003 | Casper | H03L 7/093 | |
| 2004/0042504 A1* | 3/2004 | Khoury, Jr. | H04L 7/02 | |
| | | | 370/518 | |
| 2004/0161068 A1* | 8/2004 | Zerbe | H03L 7/087 | |
| | | | 375/355 | |
| 2005/0110544 A1* | 5/2005 | Suda | G01R 31/31922 | |
| | | | 327/165 | |
| 2005/0111602 A1* | 5/2005 | Suda | H04L 7/0037 | |
| | | | 375/355 | |

| | | | | |
|---|---|---|---|---|
| 2006/0170453 A1* | 8/2006 | Zerbe | H04L 7/0331 | |
| | | | 326/37 | |
| 2006/0285583 A1* | 12/2006 | Baumgartner | G01R 31/317 | |
| | | | 375/226 | |
| 2007/0025483 A1* | 2/2007 | Emami-Neyestanak | | |
| | | | H04L 7/0337 | |
| | | | 375/355 | |
| 2007/0036020 A1* | 2/2007 | Lee | H04L 7/0037 | |
| | | | 365/230.03 | |
| 2007/0038789 A1* | 2/2007 | Macri | H03L 7/0816 | |
| | | | 710/105 | |
| 2007/0146035 A1* | 6/2007 | Law | H03L 7/0814 | |
| | | | 327/231 | |
| 2009/0092211 A1* | 4/2009 | Wang | H04L 7/0331 | |
| | | | 375/355 | |
| 2010/0315142 A1* | 12/2010 | Zerbe | H04L 7/10 | |
| | | | 327/161 | |
| 2012/0033773 A1* | 2/2012 | Nedovic | H03L 7/0807 | |
| | | | 375/371 | |
| 2012/0151247 A1* | 6/2012 | Ferraiolo | H04L 25/14 | |
| | | | 714/E11.079 | |
| 2012/0288046 A1* | 11/2012 | Lee | H04L 25/14 | |
| | | | 375/362 | |
| 2012/0294401 A1* | 11/2012 | Lin | G06F 1/10 | |
| | | | 375/362 | |
| 2013/0249612 A1* | 9/2013 | Zerbe | H04L 7/0079 | |
| | | | 327/161 | |
| 2014/0185658 A1* | 7/2014 | Sindalovsky | H04L 7/0337 | |
| | | | 375/222 | |
| 2014/0241465 A1* | 8/2014 | Itoigawa | H04L 25/0272 | |
| | | | 375/316 | |
| 2015/0010121 A1* | 1/2015 | Su | H04B 17/11 | |
| | | | 375/355 | |
| 2015/0229467 A1* | 8/2015 | Lee | H04L 7/0016 | |
| | | | 375/371 | |
| 2016/0043755 A1* | 2/2016 | Kim | G06F 13/4291 | |
| | | | 375/295 | |
| 2016/0294544 A1* | 10/2016 | Jang | H04B 1/16 | |
| 2016/0373244 A1* | 12/2016 | Lin | H03L 7/085 | |
| 2017/0097655 A1* | 4/2017 | Jeon | G06F 1/10 | |
| 2018/0054336 A1* | 2/2018 | Hori | H04L 7/0008 | |
| 2018/0131503 A1* | 5/2018 | Duan | H04L 7/0004 | |
| 2019/0243410 A1* | 8/2019 | Saito | H03L 7/099 | |
| 2020/0034319 A1* | 1/2020 | Chang | G02B 3/0068 | |
| 2020/0119901 A1* | 4/2020 | Hormati | H04L 7/0054 | |
| 2020/0403623 A1* | 12/2020 | Wu | H03L 7/18 | |
| 2021/0126765 A1* | 4/2021 | Duan | G06F 13/4291 | |
| 2021/0211266 A1* | 7/2021 | Min | H04L 7/0337 | |
| 2022/0083094 A1* | 3/2022 | Liu | G06F 1/10 | |
| 2023/0205255 A1* | 6/2023 | Liu | G06F 1/10 | |
| | | | 713/600 | |
| 2023/0412355 A1* | 12/2023 | Yanase | H04L 7/0337 | |
| 2024/0259176 A1* | 8/2024 | Cho | H04L 7/0041 | |
| 2024/0319762 A1* | 9/2024 | Liu | G06F 1/10 | |
| 2024/0323061 A1* | 9/2024 | Niu | H04L 12/4633 | |
| 2025/0184112 A1* | 6/2025 | Zhou | H04L 7/033 | |
| 2025/0233594 A1* | 7/2025 | Li | H03L 7/091 | |

* cited by examiner

Current Sampling Position of
the second data

Center Setting

Current Sampling Position of
the third data

Current Sampling Position
of the first data

Current Sampling Position of
the first data

Center Setting

Current Sampling Position of
the second data

Current Sampling Position of
the third data

METHOD AND APPARATUS OF DESKEW PROCESS FOR A CIRCUITRY, COMPUTER STORAGE MEDIUM, AND TERMINALS

PRIORITY

This application claims the benefit of priority of an earlier filed Chinese patent application Ser. No. 202311645572.0, filed on Dec. 1, 2023 with China National Intellectual Property Administration of the People's Republic of China, entitled "A Circuitry, Method, Computer Storage Medium and Terminal for Deskew Processing," the disclosure of which is hereby incorporated by reference.

FIELD

This application relates to, but is not limited to, signal and processing technology, which involves a circuitry, method, computer storage medium and terminal for deskew processing.

BACKGROUND

D-PHY (one of the Mobile Industry Processor Interface (MIPI) protocols) is a high-speed serial data transmission protocol for mobile devices and embedded systems that enables high-speed and low-power data transmission. In the D-PHY interface, the data transfer rate is high and clock and data signals are affected by changes in external environment such as voltage or transmission line distance, thereby affecting phase offset. This in turn can lead to transmission errors and data corruption, therefore a technology to reduce the phase offset between the clock and data signals is required.

D-PHY deskew technology ensures the reliability and accuracy of data transmission by phase calibration of data and clock signals. The D-PHY deskew control structure optimizes the performance of the D-PHY interface to ensure the stability and reliability of high-speed data transmission, thereby meeting the demand for high-speed data transmission in mobile devices and embedded systems.

The phase interpolator is commonly adopted in the D-PHY deskew technology to achieve phase shifting and thereby implement phase calibration, which requires multi-phase clocks to superimpose the input phases according to different weights to achieve phase shift. The implementation of the phase interpolation technique has a high system complexity and requires the cooperation of circuits such as phase-locked loops, resulting in a high cost of implementation. How to simplify the circuit composition of phase calibration has emerged as a problem to be solved.

SUMMARY

The following is an overview of the subject detailed in this application. This overview is not intended to limit the scope of the claims.

The embodiments of the present disclosure disclose a circuitry, method, computer storage medium and terminal for deskew processing that can simplify the circuit composition for phase calibration.

Firstly, the embodiments of the present disclosure disclose a circuitry for deskew processing, comprising receiving data lane, clock signal lane, deskew control module, and deskew module, wherein the receiving data lane is set to receive input data signals, which are in alternating standard sequence;

wherein the clock signal lane is set to receive input clock signals;

wherein the deskew control module is connected to the receiving data lane and is set to acquire sample data obtained by sampling the data signal of the data signal lane by the clock signal of the clock signal lane with a preset duration, and determine the delay information based on the sample data.

wherein the deskew module is connected to the deskew control module and is set to phase offset the clock and data signals based on the delay information determined by the deskew control module.

Secondly, the embodiments of the present disclosure disclose a method for deskew processing, comprising:

wherein acquire sample data obtained by sampling the data signal of the data signal lane by the clock signal of the clock signal lane with a preset duration, and determine the delay information based on the acquired sample data.

wherein adjust the phase offset of both the clock signal and the data signal based on the determined delay information.

Thirdly, the embodiments of the present disclosure disclose a computer storage medium storing computer programs, wherein when the computer program is executed by a processor, the method for deskew processing above is implemented.

Lastly, the embodiments of the present disclosure disclose a terminal comprising memory and processor, wherein the memory stores computer programs;

wherein the processor is configured to execute the computer programs in memory;

wherein when the computer program is executed by the processor, the method for deskew processing above is implemented.

Compared to the related technology, sample the data signal and determine the delay information by the deskew control module, adjust the phase offset by the delay information, simplifying the circuitry composition of phase calibration.

Additional features and benefits of the exemplary embodiment(s) of the present application will become apparent from the detailed description, figures, and claims set forth below. Additional benefits of the application can be realized and obtained through the solutions described in the detailed description and drawings.

BRIEF DESCRIPTION OF THE DRAWINGS

The exemplary embodiment(s) of the present invention will be understood more fully from the detailed description given below and from the accompanying drawings of various embodiments of the invention, which, however, should not be taken to limit the invention to the specific embodiments, but are for explanation and understanding only.

DETAILED DESCRIPTION

Figure 1:
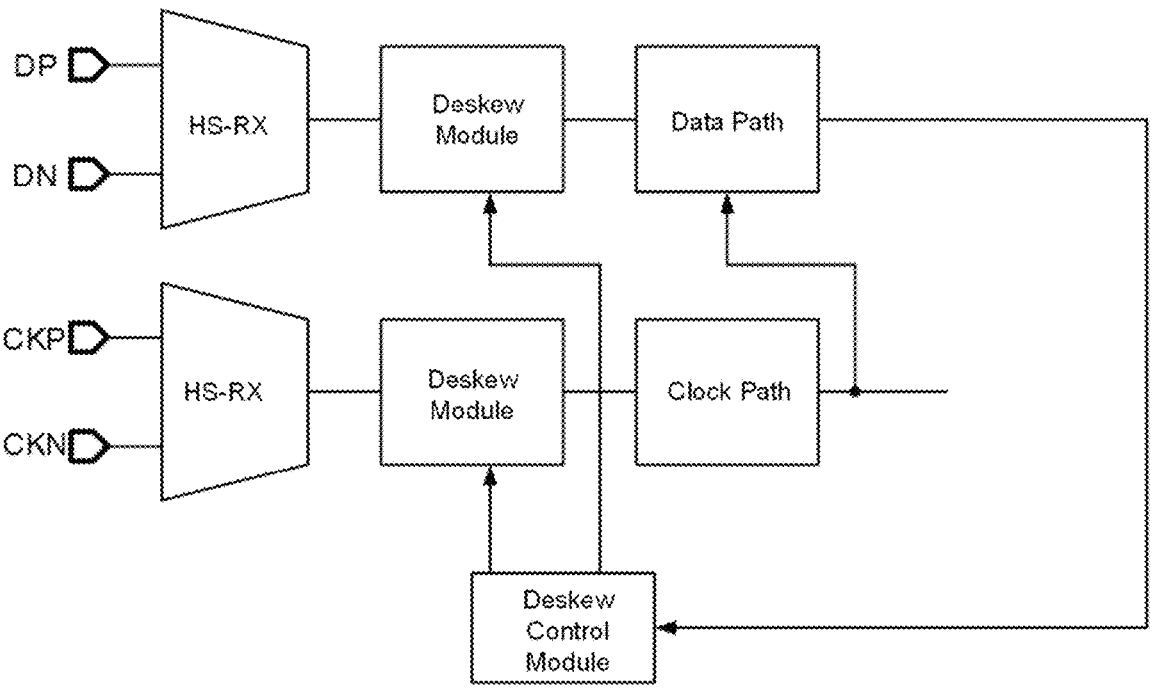
FIG. 1 is a block diagram illustrating the circuitry for deskew processing in accordance with one embodiment of the present invention.

Embodiments of the present invention disclose a circuitry, method, computer storage medium and terminal for deskew processing. The present application describes multiple embodiments, but the description is exemplary and not limiting, and it will be obvious to those of ordinary skill in the art that there can be more embodiments within the scope of the embodiments described in the present application. Although many possible combinations of features are illustrated in the drawings and discussed in the detailed description, many other combinations of the disclosed features are possible. Unless specifically limited, any feature or element of any embodiment may be combined with any other feature or element of any other embodiment, or may substitute for any other feature or element of any other embodiment.

The present application includes and contemplates combinations with features and elements known to those of ordinary skill in the art. The embodiments, features, and elements that have been disclosed in the present application may also be combined with any conventional features or elements to form a unique invention as limited by the claims. Any feature or element of any embodiment may also be combined with features or elements from other invention embodiments to form another unique invention embodiment limited by the claims. Accordingly, it should be understood that any of the features illustrated and/or discussed in this application may be realized individually or in any proper combination. Accordingly, In addition to the limitations imposed in accordance with the appended claims and their equivalents, no other limitations are placed on the embodiments. In addition, various modifications and changes may be made within the protection scope of the appended claims.

Furthermore, in describing representative embodiments, the detailed description may have presented the method and/or process as a particular sequence of steps. However, to the extent that the method or process does not depend on a particular sequence of steps described herein, the method or process should not be limited to the particular sequence of steps described. As those of ordinary skill in the art will understand, other sequence of steps is possible. Thus, the particular sequence of steps set forth in the detailed description should not be construed as a limitation of the claims. Furthermore, the claims directed to the method and/or process should not be limited to the steps of performing them in the order in which they are written, and it can be readily understood by those of ordinary skill in the art that these orders can be varied and still remain within the spirit and scope of the embodiments of the present application.

The structure diagram of the circuitry for deskew processing in the embodiments of the present disclosure is shown in FIG. 1, comprising receiving data lane, clock signal lane, deskew control module, and deskew module; wherein the receiving data lane is set to receive input data signals, which are in alternating standard sequence, and can be clock pattern data consisting of alternating sequences of 0 and 1; The clock pattern data in the embodiments of the present disclosure may be periodic data similar to clock (010101 . . . 0101); the data signal includes data positive (DP) signals and data negative (DN) signals;

wherein the clock signal lane is set to receive input clock signals; The clock signal in the embodiments of the present disclosure includes clock positive (CKP) signals and clock negative (CKN) signals;

wherein the deskew control module is connected to the receiving data lane and is set to acquire sample data obtained by sampling the data signal of the data signal lane by the clock signal of the clock signal lane with a preset duration, and determine the delay information based on the sample data.

wherein the deskew module is connected to the deskew control module and is set to phase offset the clock and data signals based on the delay information determined by the deskew control module.

In an exemplary embodiment, the deskew module in the embodiments of the present disclosure is set to output the clock signal after the phase offset adjustment to the clock path which is used for transmitting the clock signal in the clock signal lane, and output the data signal after the phase shift adjustment to the data path which is used for transmitting the data signal in the receiving data lane;

In an exemplary embodiment, between the receiving data lane and deskew module, the embodiments of the present disclosure further comprise a high speed receive (HS-RX) module, which is set to:

Preprocess data signals and clock signals output to the deskew module;

wherein the preprocessing comprises one or any combination of the following processing: acquisition, amplification, and filtering.

In an exemplary embodiment, the embodiments of the present disclosure further comprise deserializers connected to the output of deskew module, which are set to output the parallel data transformed from the serial signal of the clock signal on the clock path and the data signal on the data path.

In an exemplary embodiment, the deskew control module in the embodiments of the present disclosure comprises sample units, delay determination units, and control character determination units;

wherein the sample unit is set to acquire the sample data obtained by sampling the data signal of the receiving data signal lane by the clock signal of with a preset duration;

wherein the delay determination unit is set to count and accumulate the number of 0 and 1 in the sample data of the rising edge, as well as the number of 0 and 1 in the sample data of the falling edge according to a preset accumulation period based on the sample data; determine the delay information according to the statistics results of the counting and accumulation, wherein the accumulation period is determined by a preset statistical threshold.

Those of ordinary skill in the art can calculate the statistical thresholds in the embodiments of the present disclosure based on Tskewcal and sample frequency, e.g., $(Tskewcal*LSB)/(4*2*T*UI^2)$, wherein Tskewcal is a well-known term in the DPHY protocol referring to the deskew computation time, as defined in the DPHY 1.2 protocol.

In an exemplary embodiment, the embodiments of the present disclosure can store sample data using "data<7:0>", an array or memory with a data width of 8 bits. The odd bits of "data<7:0>" represent the sample data of the rising edge, while even bits represent the sample data of the falling edge, with both 0 and 1 in the sample data.

In an exemplary embodiment, the delay determination unit in the embodiments of the present disclosure is set to count and accumulate the number of 0 and 1 in the sample data of the rising edge, as well as the number of 0 and 1 in the sample data of the falling edge according to a preset accumulation period, each counting and accumulation statistics comprises:

When the counting and accumulation statistics value of 0 and/or 1 in the sample data of the rising edge reaches the statistical threshold, the counting and accumulation statistics of the rising edge ends;

When the counting and accumulation statistics value of 0 and/or 1 in the sample data of the falling edge reaches the statistical threshold, the counting and accumulation statistics of the rising edge ends.

The counter in the embodiments of the present disclosure counts the number of 0 and 1 in the sample data of the rising edge and the number of 0 and 1 in the sample data of the falling edge, supporting for determining delay information based on the counting results. The input of the deskew module inputs the clock model data (01010101 . . . 0101). When receiving the request signal and preset valid data, the counter counts the number of 0 and 1 in the sample data of the rising edge and the number of 0 and 1 in sample data of the falling edge; and then counts and accumulates according to a preset accumulation period, which is determined by M_th. When the counting statistic value of the counter reaches M_th, one counting is finished.

In an exemplary embodiment, the delay determination unit in the embodiments of the present disclosure is set to determine the delay information based on the statistics results of the counting and accumulation, comprising:

Upon each determination that the counting and accumulation statistics of the rising edge have ended, the following processing is performed: determine the data corresponding to the rising edge based on the statistics result of the counting and accumulation of the rising edge; record the determined data corresponding to the rising edge, and when the recorded data reaches a preset length, detect the rising edge based on the data corresponding to the rising edge; determine the current sampling location of each detected rising edge; when the number of detected rising edges is greater than or equal to the preset quantity, determine the delay information of the rising edge based on the determined current sampling location of the rising edge.

Upon each determination that the counting and accumulation statistics of the falling edge have ended, the following processing is performed: determine the data corresponding to the falling edge based on the statistics result of the counting and accumulation of the falling edge; record the determined data corresponding to the falling edge, and when the recorded data reaches a preset length, detect the falling edge based on the data corresponding to the falling edge; determine the current sampling location of each detected falling edge; when the number of detected falling edges is greater than or equal to the preset quantity, determine the delay information of the falling edge based on the determined current sampling location of the falling edge.

The preset quantity in the embodiments of the present disclosure can take the values of 2 or 3, the greater the value, the higher the processing accuracy. In an exemplary embodiment, those of ordinary skill in the art can analyze and set the preset duration in the embodiments of the present disclosure based on the above preset quantity. For example, setting a clock with a preset duration equal to two unit intervals (2UI), that is 2UI clock, ensures that both rising edge edges and falling edge edges can be found regardless of where the start position of the sample data is.

In the embodiments of the present disclosure, when the data corresponding to the recorded rising and falling edges reaches the preset length, detect the rising and falling edges, and determines whether it is a rising edge or a falling edge of one UI. If it is not the rising edge and the falling edge of a UI, set an interval of several cycles to continue the above statistics on the sample data until an edge of one UI is found, then the statistics ends.

In an exemplary embodiment, the delay determination unit in the embodiments of the present disclosure is set to determine the data corresponding to the rising edge based on the statistics results of the counting and accumulation for the rising edge, comprising:

Upon the counting and accumulation statistics have ended, if the counting and accumulation statistics value of 0 in the sample data of the rising edge reaches the preset statistical threshold (M_th), then determine the data corresponding to the rising edge is 0;

Upon the counting and accumulation statistics have ended, if the counting and accumulation statistics value of 1 in the sample data of the rising edge reaches M_th, or both of the counting and accumulation statistics value of 0 and 1 in the sample data of the rising edge reaches M_th, then determine the data corresponding to the rising edge is 1.

In an exemplary embodiment, the delay determination unit in the embodiments of the present disclosure is set to determine the data corresponding to the falling edge based on the statistics results of the counting and accumulation for the falling edge, comprising:

Upon the counting and accumulation statistics have ended, if the counting and accumulation statistics value of 0 in the sample data of the falling edge reaches M_th, then determine the data corresponding to the falling edge is 0.

Upon the counting and accumulation statistics have ended, if the counting and accumulation statistics value of 1 in the sample data of the falling edge reaches M_th, or both of the counting and accumulation statistics value of 0 and 1 in the sample data of the falling edge reaches M_th, then determine the data corresponding to the falling edge is 1.

In an exemplary embodiment, when the embodiments of the present disclosure record the determined data corresponding to the rising edge, the determined data can be sent to the rising edge shift register; when the determined data corresponding to the falling edge is recorded, the determined data can be sent to the falling edge shift register; and whether or not the data corresponding to the recorded rising edge and the data corresponding to the recorded falling edge reaches the preset length can be determined by whether or not the rising edge shift register and the falling edge shift register are written full.

In an exemplary embodiment, after the determined data corresponding to the rising edge and the determined data corresponding to the falling edge is recorded, the method of the embodiment of the present disclosure will zero out the results of the counting and accumulation statistics for the data corresponding to the rising edge and the falling edge.

In an exemplary embodiment, the current sample location (cur_setting) of the rising edge of the embodiments of the present disclosure is the current sampling location of the penultimate data in the data corresponding to the rising edge with the preset length; the current sampling location of the falling edge is the current sampling location of the penultimate data in the data corresponding to the falling edge with the preset length;

wherein both of the initial value of the current sampling location of the data corresponding to rising edge and falling edge are 0. Upon each determination of data corresponding to one rising edge, a preset minimum delay step, Least Significant Bit (LSB), will be added to the current sampling location of the data corresponding to the previous rising edge to obtain the current sampling location of the current data. Upon each determination of data corresponding to one falling edge, an LSB will be added to the current sampling location of the data corresponding to the previous falling edge to obtain the current sampling location of the current data.

The embodiments of the present disclosure achieve real-time synchronized updating of the current sampling position based on the above operations, and obtain the current sampling position of each data.

In an exemplary embodiment, the delay determination unit in the embodiments of the present disclosure is set to determine the delay information of the rising edge based on the determined current sampling position of the rising edge, comprising:

when the number of detected rising edges is greater than or equal to the preset quantity, and the current sampling location of each rising edge is less than or equal to the preset maximum sampling position threshold (MAX_SETTING), calculate the average of the current sampling locations of the two rising edges among the detected rising edges of preset quantity. Add the averaged result to the preset offset and perform the first limiting processing based on the maximum sampling position threshold. Use the result of the first limiting processing as the delay information of the rising edge.

The maximum sampling position threshold (MAX_SETTING) in the embodiments of the present disclosure is the maximum setting value fed back to the deskew delay unit. This value is calculated based on 2UI and LSB. For example, by computing 1.5UI/LSB and rounding up to the nearest integer power of 2, the sampling length falls between 1.5UI and 2UI (ensuring the capture of 3 edges). The embodiments of the present disclosure calculate a value range of [1, 127] for the maximum sampling position threshold according to the clock frequency and LSBs currently supported. A larger value for the maximum sampling position threshold in the embodiments of the present disclosure is preferable.

In an exemplary embodiment, the delay determination unit in the embodiments of the present disclosure is set to determine the delay information of the falling edge based on the determined current sampling position of the falling edge, comprising:

when the number of detected falling edges is greater than or equal to the preset quantity, and the current sampling location of each falling edge is less than or equal to the preset maximum sampling position threshold, calculate the average of the current sampling locations of the two falling edges among the detected falling edges of preset quantity. Add the averaged result to the preset offset and perform the second limiting processing based on the maximum sampling position threshold. Use the result of the second limiting processing as the delay information of the falling edge.

The embodiments of the present disclosure correct a certain deviation by adding the calculation of the offset, and avoid the occurrence of an error in the current sampling position due to the correction of the deviation by the first limiting processing and the second limiting processing.

In an exemplary embodiment, the delay determination unit is set to perform the first limiting processing based on the maximum sampling position threshold after add the averaged result to the preset offset, comprising:

calculate the average of the current sampling locations of the two rising edges among the detected rising edges of preset quantity. When the value of average result plus the preset offset is greater than the maximum sampling position threshold, assign the value of the averaged result plus the offset value to the maximum sampling position threshold.

In an exemplary embodiment, the delay determination unit is set to perform the second limiting processing based on the maximum sampling position threshold after add the averaged result to the preset offset, comprising:

calculate the average of the current sampling locations of the two falling edges among the detected falling edges of preset quantity. When the value of average result plus the preset offset is greater than the maximum sampling position threshold, assign the value of the averaged result plus the offset value to the maximum sampling position threshold.

In an exemplary embodiment, the delay determination unit in the embodiments of the present disclosure is further set to:

before the number of detected rising edges is greater than or equal to preset quantity, when the current sampling location rising edge is greater than the maximum sampling position threshold MAX_SETTING, feedback the incorrect information in the data;

before the number of detected falling edges is greater than or equal to preset quantity, when the current sampling location of the falling edge is greater than the maximum sampling position threshold MAX_SETTING, feedback the incorrect information in the data.

In an exemplary embodiment, the deskew module in the embodiments of the present disclosure comprises encode delay controller and delay timer;

wherein the encoding delay controller is set to generate control characters for phase offset adjustment based on the received delay information.

The delay timer is set to encode the delay information based on the control characters to adjust the phase offset of the clock signal or data signal, achieving the desired phase shift;

wherein, the delay information includes delay step and total delay time.

Figure 2:
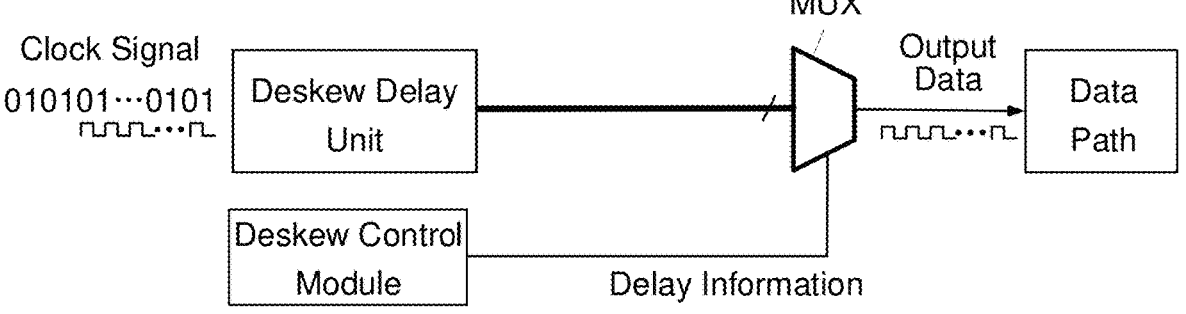
FIG. 2 is a diagram illustrating the module for deskew processing in accordance with one embodiment of the present invention.
Figure 3:
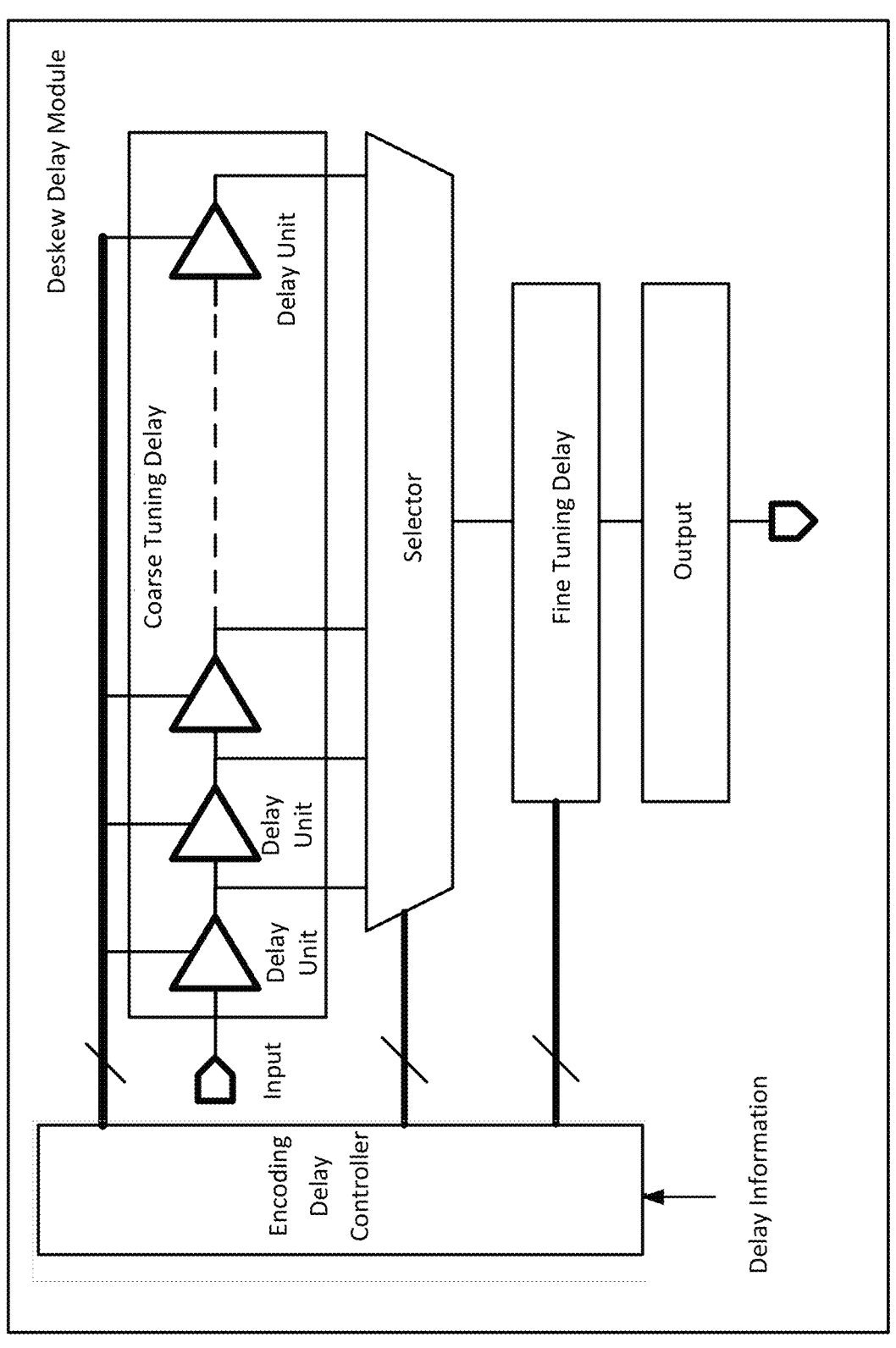
FIG. 3 is a diagram illustrating the delay unit for deskew processing in accordance with one embodiment of the present invention.

In an exemplary embodiment, the embodiments of the present disclosure can determine the control character for phase offset adjustment by a calibration algorithm including a self-calibration deskew algorithm. The deskew module contains deskew delay units which can translate the data signals or the clock signals to the point where the two are orthogonal to each other based on the delay information. FIG. 2 is a diagram of the deskew module in the embodiments of the present disclosure, wherein the deskew control module feeds back the delay information to the deskew delay unit in the deskew module and implements the delay adjustment through the deskew unit. FIG. 3 is a diagram of the composition of an deskew delay unit in the embodiments of the present disclosure. The working principle of the deskew delay unit is as follows: generate control characters for phase offset adjustment based on the received delay information, and send the control characters to the encode delay controller, thereby setting the coarse tuning delay unit and the fine tuning delay unit of the delay controller respectively, and thus obtaining the phase shift required for the clock signal or the data signal, wherein the coarse tuning delay unit controls the total delay length of the data, and the fine tuning delay unit controls the delay step.

Figure 4:
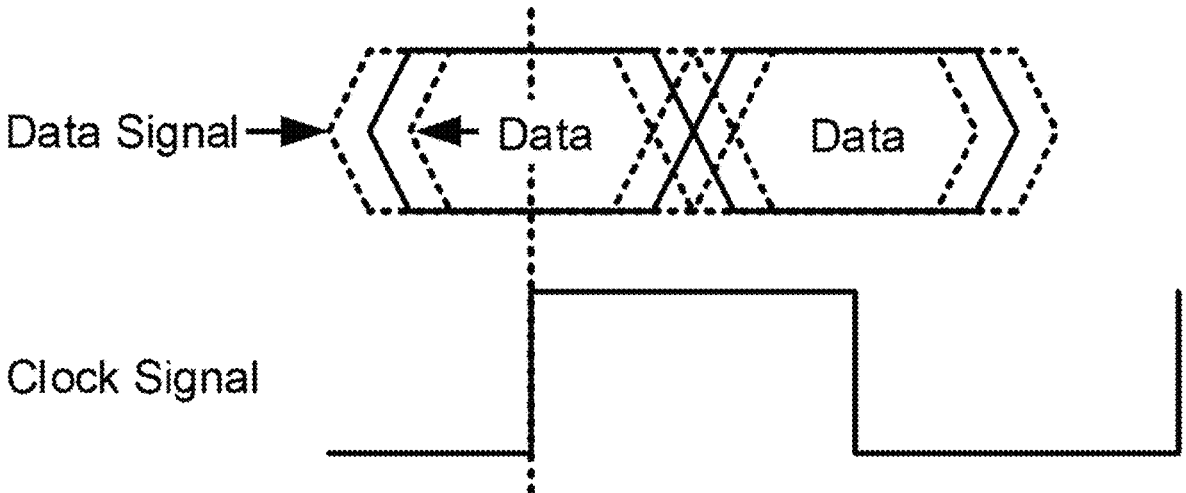
FIG. 4 is a diagram illustrating the phase offset of one clock signal and one data signal in accordance with one embodiment of the present invention.
Figure 5:
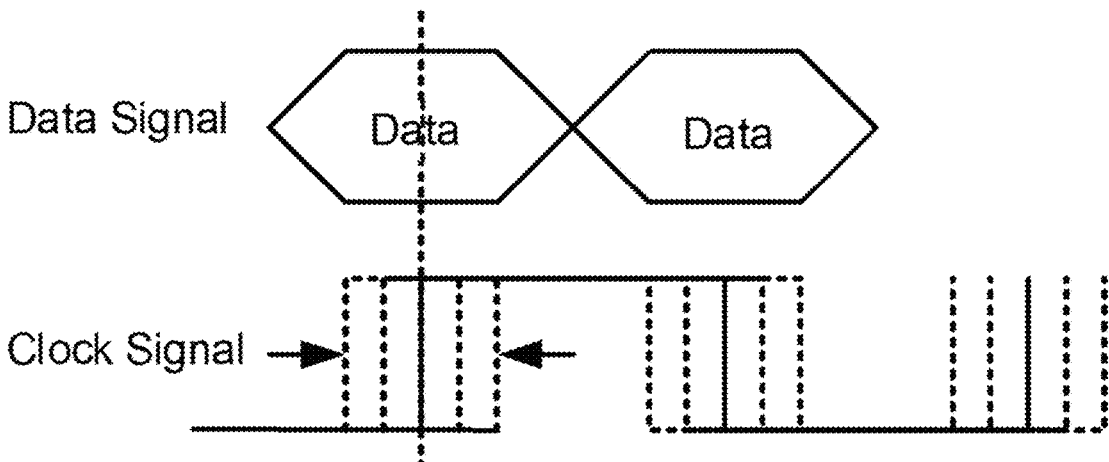
FIG. 5 is a diagram illustrating the phase offset of the other clock signal and data signal in accordance with one embodiment of the present invention.

The deskew control module in the embodiments of the present disclosure monitors the skew of the clock signal and the data signal in real time, and generates the control characters for adjusting and controlling (by means of a self-calibration deskew algorithm) the deskew delay time of the deskew delay unit based on the change of the skew, and then controls the clock or the data phase shift by the generated control characters. In an exemplary embodiment, the embodiments of the present disclosure control the clock or the data phase shift by the generated control characters, enabling data or clock signals to be shifted to have a phase difference of 0.5 UI between them. FIG. 4 and FIG. 5 are the diagram of the phase offset of the clock signal and the data signal in the embodiments of the present disclosure, illustrating that the embodiment of the present disclosure maintains the synchronization of the clock signal and the data signal.

The embodiments of the present disclosure further disclose a method for deskew processing, comprising:

FIG. 4 illustrates acquiring sample data obtained by sampling the data signal of the data signal lane by the clock signal of the clock signal lane with a preset duration, and determining the delay information based on the acquired sample data.

FIG. 5 illustrates adjusting the phase offset of both the clock signal and the data signal based on the determined delay information.

The processing of sampling the data signal and determining the delay information as described above in the embodiments of the present disclosure can be implemented by a circuitry with a simple structure, and the deskew module implements the phase offset adjustment by the delay information, simplifying the circuit composition of the phase calibration.

The embodiments of the present disclosure disclose a computer storage medium storing computer programs, wherein when the computer program is executed by a processor, the method for deskew processing above is implemented.

The embodiments present disclosure further disclose a terminal comprising memory and processor, wherein the memory stores computer programs;

wherein the processor is configured to execute the computer programs in memory;

wherein when the computer program is executed by the processor, the method for deskew processing above is implemented.

The following application examples provides a brief explanation of the embodiments of the present disclosure, which are solely intended to illustrate the embodiments of the present disclosure and not to limit the scope of protection thereof.

Application Example

Figure 6:
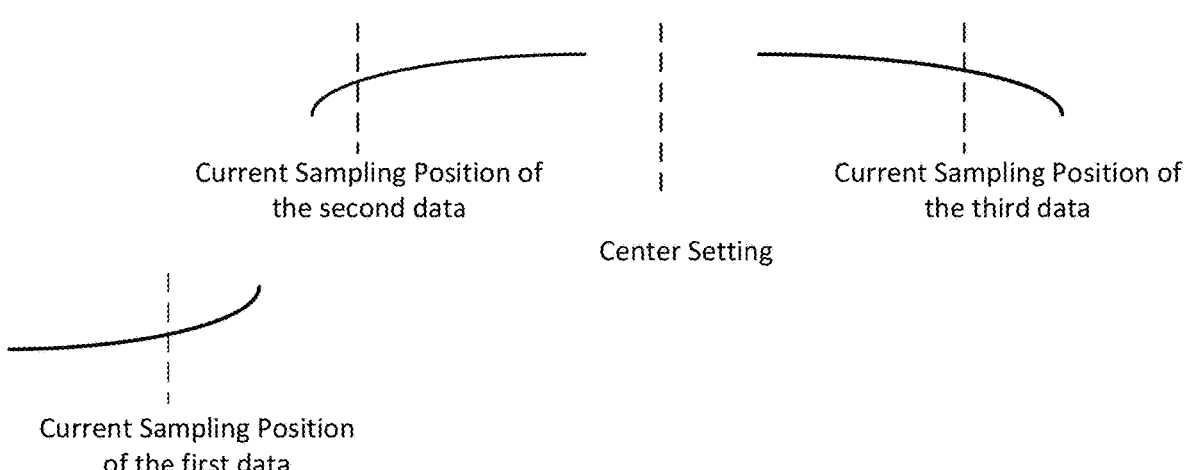
FIG. 6 is a diagram illustrating the sample data of the rising and falling edges in accordance with one embodiment of the present invention.
Figure 6:
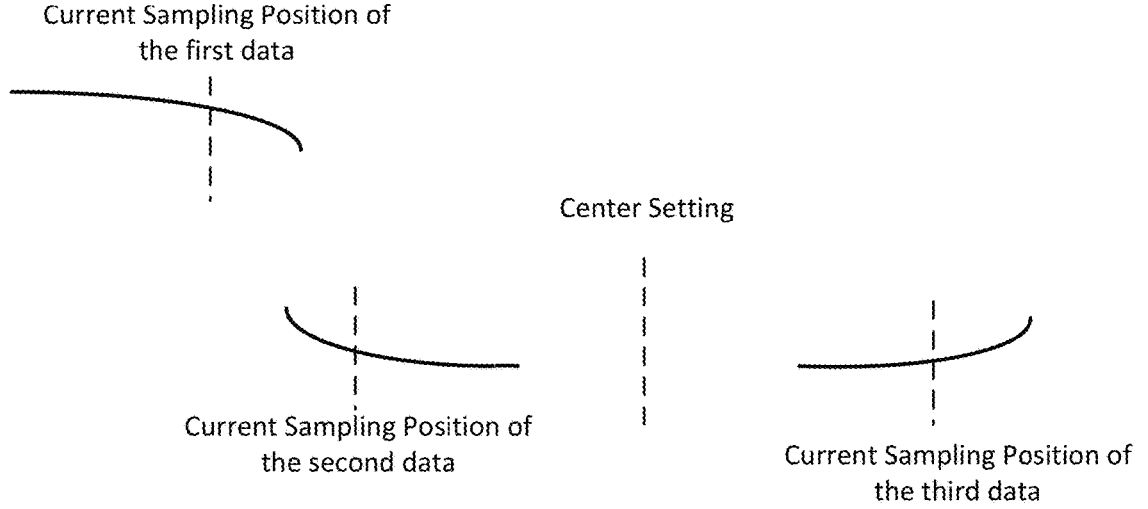
Figure 7:
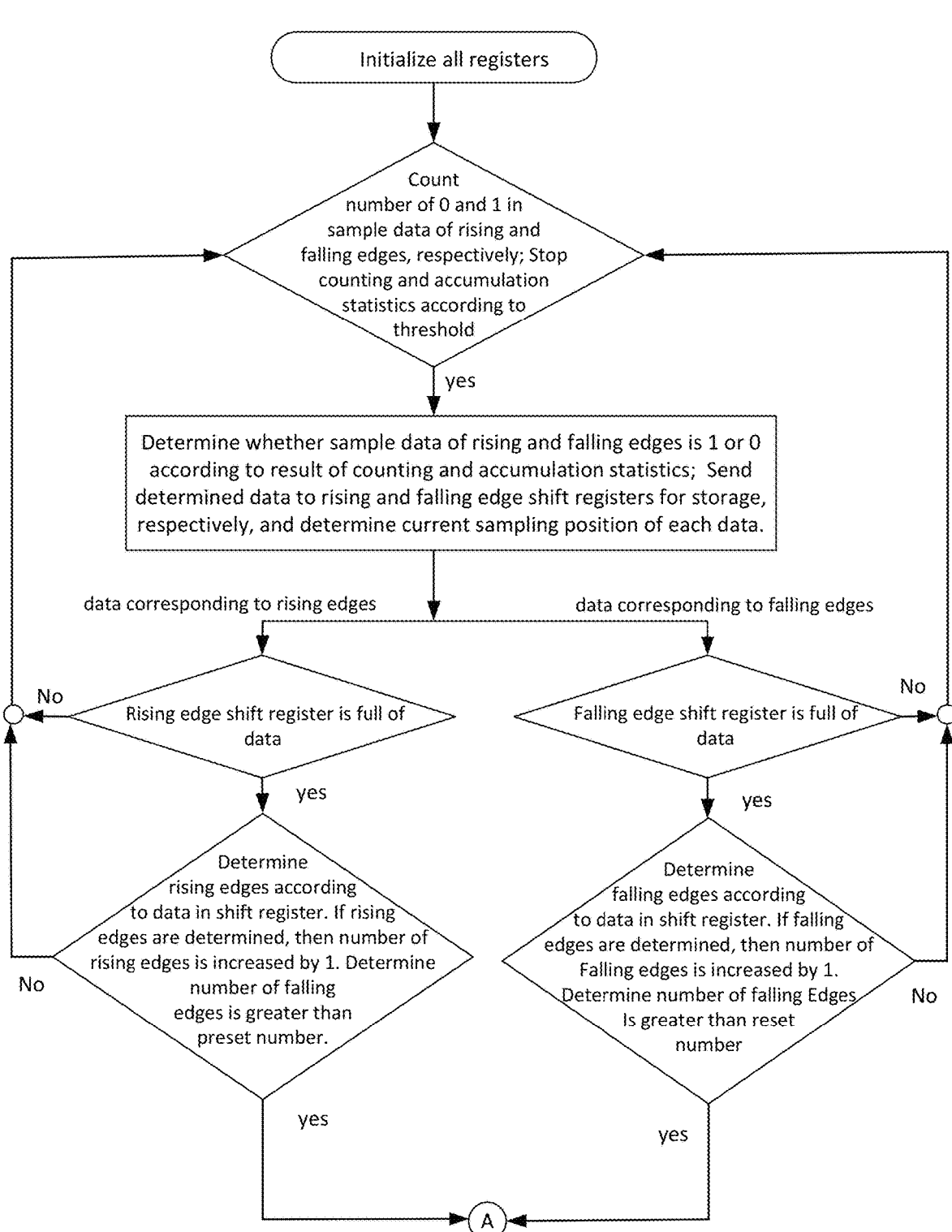
FIGS. 7-8 illustrate a flow diagram illustrating the embodiment of the present invention.
Figure 8:
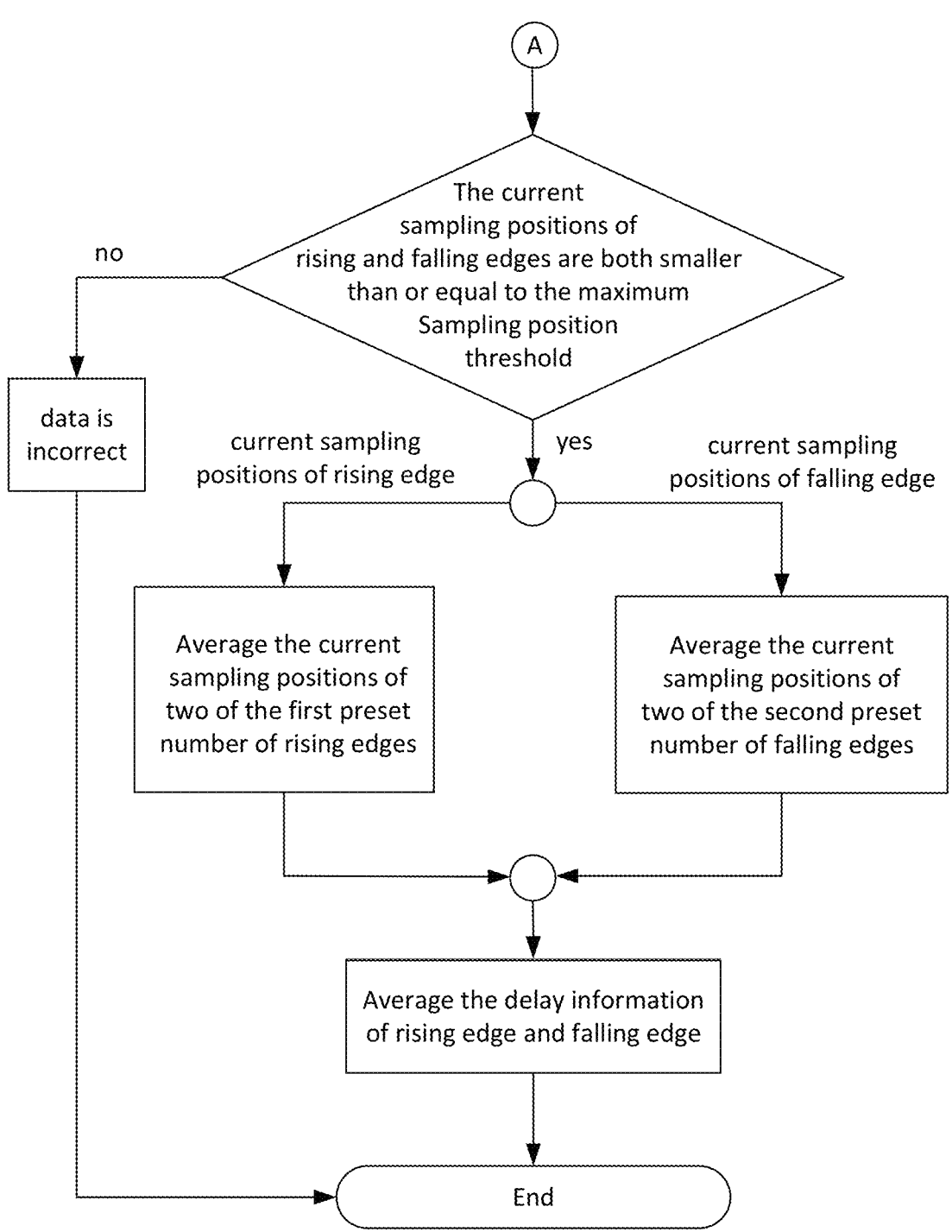

The process of determining the delay information in the embodiments of the present disclosure is shown below. Input the clock pattern of 01010101 . . . 0101 through data lanes. Clock lane inputs a clock signal of 2UI clock cycles. Input an initial value of 0 to the deskew control module of the MUX control terminal in FIG. 2. FIG. 6 is a diagram of the sample data on the rising and falling edges in the embodiment of the present disclosure. Collect the data by the deskew control module through the rising and falling edges of the clock, respectively. Use counter to count the number of 0 and 1 in the odd and even bits of the sample data in FIG. 1, respectively. Determine the delay information according to the detected current sampling position of the edge and output the delay information to the deskew module of the MUX control terminal. FIG. 7 and FIG. 8 show the flow chart of the embodiments of the present disclosure wherein FIG. 7 illustrates a first portion of the flowchart and FIG. 8 illustrates a second portion of the flowchart, comprising:

Step 1: Initialize all registers, including: registers for storing sample data, the number of 0 in the sample data of rising edge, the number of 1 in the sample data of rising edge, the number of 0 in the sample data of falling edge, and the number of 1 in the sample data of falling edge; the registers may be general-purpose registers used in the internal operations for storing the sample data, the operations participating in the statistics, and the results of the operations.

Step 2: When the deskew module receives a preset request signal and valid data (the preset request signal and valid data can be a preset trigger command), the rising and falling edges of the clock (refer to FIG. 6, where 0->1 is the rising edge, and 1->0 is the falling edge) sample the output data, respectively. Count and accumulate the number of 0 and 1 of the sample data in accordance with the preset accumulation period. The number of 0 in the sample data of rising edge obtained by accumulation is denoted as pont0; the number of 1 in the sample data of rising edge obtained by accumulation is pent1; the number of 0 in the sample data of falling edge obtained by accumulation is nent0; and the number of 1 in the sample data of falling edge obtained by accumulation is nent1. In the process of accumulation, pont1, pont0, ncnt1, and ncnt0 are constantly compared with M_th. When pont0>=M_th or pont1>=M_th, the counting of the sample data of the rising edge is stopped; when nent0>=M_th or nent1>=M_th, the counting of the sample data of the falling edge is stopped, and when accumulation period is determined to reach, stop the counting of the number of 0/1 in the sample data.

Step 3: compare the numeric values of pont1, pont0, ncnt1, and ncnt0 to determine whether the data corresponding to the rising edge and the falling edge is 1 or 0. The embodiment of the present disclosure can determine the data corresponding to the rising edge and the falling edge according to pcnt0, pcnt1, ncnt0, and nent1. When pont0 reaches M_th first, determine that the data corresponding to the rising edge is 0. When pont1 reaches M_th first or pont0 and pent1 reach M_th at the same time, determine that the data corresponding to the rising edge is 1. When nent0 reaches M_th first, determine that the data corresponding to the falling edge is 0. When nent1 reaches M_th first or nent0 and nent1 reach M_th at the same time, determine that the data corresponding to the falling edge is 1. Send the determined data corresponding to the rising edge to the rising edge shift register for storage, and send the determined data corresponding to the falling edge to the falling edge shift register for storage. The lengths of the rising edge shift register and the falling edge shift register are equal, and both of them can take the value of 3~8, and the higher the precision, the longer the length. Initialize the current sampling position (cur_setting) of the rising edge and the cur_setting of the falling edge to 0. Whenever a data corresponding to a rising edge is determined, the smallest step size (LSB) of the sample data is accumulated to the cur_setting of the rising edge as the current sampling position of the data corresponding to the rising edge; and when a data corresponding to a falling edge is determined, the LSB of the sampled data is added to the falling edge immediate sampling position cur_setting, which is used as the current sampling position of the data corresponding to the falling edge. Whenever a data corresponding to a falling edge is determined, the LSB of the sample data is accumulated to the cur_setting of the falling edge as the current sampling position of the data corresponding to the falling edge. LSB is the preset delay step of the deskew delay module. Zero out pont0, pent1, nent0, and nent1 of the determined data.

Step 4: When the rising edge shift register and falling edge shift register are full of data, determine the number of rising edges detected by the rising edge sample data, pedge_cnt, and the number of falling edges detected by the falling edge sample data, nedge_cnt, respectively; For rising edges, if pedge_cnt<p, p is the preset number in the embodiments of the present disclosure, taken as 2 or 3. p can be configured through the registers of the single edge trigger (EN_ONE_EDGE). The number of rising edges that need to be detected by the sample data for the rising edge should be at least p, and then determine whether the data in the rising edge shift register is a rising edge or not; For example, the length of a shift registers configured in the embodiments of the present disclosure is 4. Those of ordinary skills in the art will recognize that data of 4'h1110/4'h0001/4'h0111/4'h1000 are determined as rising edges. If rising edges are determined according to the data in the rising edge shift register, then pedge_cnt is increased by 1 (pedge_cnt++); if not, jump to step 2 of sampling statistics. If pedge_cnt>=p, jump to step 5. For falling edges, if nedge_cnt<p, determine whether the data in the falling edge shift register is a falling edge or not. If falling edges are determined according to the data in the falling edge shift register, then nedge_cnt is increased by 1 (nedge_cnt++); if not, jump to the step 2 of sampling statistics. If nedge_cnt>=p, jump to step 5.

Step 5: When a rising edge is detected, determine that whether the rising edge's cur_setting≤MAX_SETTING or not, calculate the current sampling center value (center setting) according to the current sampling position of each of the detected rising edges (The embodiment of the present disclosure average the result of averaging the current sampling positions of two of the preset number of detected rising edges. As shown in FIG. 6, the center_setting denoted as pcenter_code_setting is obtained by averaging the current sampling positions of more than two rising edges. For example, when three rising edges are included, two of the current sampling positions of the first rising edge, the current sampling position of the second rising edge, and the current sampling position of the third rising edge are averaged to obtain the above mentioned center setting.). The center setting is added to the offset value and then processed with a first limiting value to obtain the delay information of the rising edge. Before the embodiment of the present disclosure detects that the number of rising edges is greater than or equal to a preset number of edges, the current sampling position of the rising edges is greater than the maximum sampling position threshold, then feedback data error information; similarly, determine the processing of the delay information of the falling edge, and the average value of the best_code_setting is outputted to the encode delay controller according to the delay information of the rising edge and the falling edge.

Those of ordinary skills in the art will recognize that some or all of the steps, systems, and functional modules/units in the devices disclosed above may be implemented as software, firmware, hardware, and suitable combinations thereof. In hardware implementations, the division between functional modules/units referred to in the above description does not necessarily correspond to the division of physical components; for example, a physical component may have more than one function, or a function/step may be cooperatively performed by several physical components. Some or all of the components may be implemented as software executed by a processor, such as a digital signal processor or microprocessor, or as hardware, or as an IC, such as ASIC. Such software may be distributed on computer-readable media, including computer storage media (or non-volatile media) and communication media (or non-volatile media). Those of ordinary skills in the art will recognize that the term computer storage medium includes volatile, non-volatile, removable, and non-removable media implemented in any method or technique for storing information, such as computer-readable instructions, data structures, program modules or other data. The computer storage medium includes, but not limited to, RAM, Read Only Memory (ROM), electrically erasable programmable read-only memory ("EEPROM"), flash memory or other memory technology, compact disc read-only memory (CD-ROM), Digital Versatile Disc (DVD), or other optical disc storage, magnetic disk, magnetic tape, magnetic disk storage, or any other media capable of storing desired information and accessible by a computer. In addition, those of ordinary skills in the art will recognize that the communication medium typically contains computer-readable instructions, data structures, program modules, or other data in a modulated data signal such as a carrier wave or other transmission mechanism, and any information delivery medium.

What is claimed is:

1. A circuitry for deskew processing, comprising:
receiving data lane, clock signal lane, deskew control module, and deskew module,
wherein the receiving data lane is set to receive input data signals, which are in alternating standard sequence;
wherein the clock signal lane is set to receive input clock signals;
wherein the deskew control module is connected to the receiving data lane and is set to acquire sample data obtained by sampling the data signal of the data signal lane by the clock signal of the clock signal lane with a preset duration, and determine the delay information based on the sample data;
wherein the deskew module is connected to the deskew control module and is set to adjust the phase offset of both the clock signal and the data signal based on the delay information determined by the deskew control module.

2. The circuitry of claim 1, wherein the deskew control module comprises a sample unit and a delay determination unit,
wherein the sample unit is set to acquire the sample data obtained by sampling the data signal of the receiving data signal lane by the clock signal of the clock signal lane with a preset duration;
wherein the delay determination unit is set to count and accumulate the number of 0 and 1 in the sample data of the rising edge, as well as the number of 0 and 1 in the sample data of the falling edge according to a preset accumulation period based on the sample data; determine the delay information according to the statistics results of the counting and accumulation;
wherein the accumulation period is determined by a preset statistical threshold.

3. The circuitry of claim 2, wherein the delay determination unit is set to count and accumulate the number of 0 and 1 in the sample data of the rising edge, as well as the number of 0 and 1 in the sample data of the falling edge according to a preset accumulation period, each counting and accumulation statistics comprises:

When the counting and accumulation statistics value of 0 and/or 1 in the sample data of the rising edge reaches the statistical threshold, the counting and accumulation statistics of the rising edge ends; and When the counting and accumulation statistics value of 0 and/or 1 in the sample data of the falling edge reaches the statistical threshold, the counting and accumulation statistics of the rising edge ends.

4. The circuitry of claim 3, wherein the delay determination unit is set to determine the delay information based on the statistics results of the counting and accumulation, comprising:

Upon each determination that the counting and accumulation statistics of the rising edge have ended, the following processing is performed: determine the data corresponding to the rising edge based on the statistics result of the counting and accumulation of the rising edge; record the determined data corresponding to the rising edge, and when the recorded data reaches a preset length, detect the rising edge based on the data corresponding to the rising edge; determine the current sampling location of each detected rising edge; when the number of detected rising edges is greater than or equal to the preset quantity, determine the delay information of the rising edge based on the determined current sampling location of the rising edge; and Upon each determination that the counting and accumulation statistics of the falling edge have ended, the following processing is performed: determine the data corresponding to the falling edge based on the statistics result of the counting and accumulation of the falling edge; record the determined data corresponding to the falling edge, and when the recorded data reaches a preset length, detect the falling edge based on the data corresponding to the falling edge; determine the current sampling location of each detected falling edge; when the number of detected falling edges is greater than or equal to the preset quantity, determine the delay information of the falling edge based on the determined current sampling location of the falling edge.

5. The circuitry of claim 4, wherein the delay determination unit is set to determine the data corresponding to the rising edge based on the statistics results of the counting and accumulation for the rising edge, comprising:

Upon the counting and accumulation statistics have ended, if the counting and accumulation statistics value of 0 in the sample data of the rising edge reaches the preset statistical threshold, then determine the data corresponding to the rising edge is 0;

Upon the counting and accumulation statistics have ended, if the counting and accumulation statistics value of 1 in the sample data of the rising edge reaches the statistical threshold, or both of the counting and accumulation statistics value of 0 and 1 in the sample data of the rising edge reaches the statistical threshold, then determine the data corresponding to the rising edge is 1.

6. The circuitry of claim 4, wherein the delay determination unit is set to determine the data corresponding to the falling edge based on the statistics results of the counting and accumulation for the falling edge, comprising:

Upon the counting and accumulation statistics have ended, if the counting and accumulation statistics value of 0 in the sample data of the falling edge reaches the preset statistical threshold, then determine the data corresponding to the falling edge is 0; and Upon the counting and accumulation statistics have ended, if the counting and accumulation statistics value of 1 in the sample data of the falling edge reaches the statistical threshold, or both of the counting and accumulation statistics value of 0 and 1 in the sample data of the falling edge reaches the statistical threshold, then determine the data corresponding to the falling edge is 1.

7. The circuitry of claim 4, wherein, the current sampling location of the rising edge is the current sampling location of the second-to-last data in the data corresponding to the rising edge of the preset length;

wherein, the current sampling location of the falling edge is the current sampling location of the second-to-last data in the data corresponding to the falling edge of the preset length;

wherein both of the initial value of the current sampling location of the data corresponding to rising edge and falling edge are 0; Upon each determination of data corresponding to one rising edge, a preset minimum delay step, Least Significant Bit (LSB), will be added to the current sampling location of the data corresponding to the previous rising edge to obtain the current sampling location of the current data; Upon each determination of data corresponding to one falling edge, an LSB will be added to the current sampling location of the data corresponding to the previous falling edge to obtain the current sampling location of the current data.

8. The circuitry of claim 4, wherein the delay determination unit is set to determine the delay information of the rising edge based on the determined current sampling location of the rising edge, comprising:

when the number of detected rising edges is greater than or equal to the preset quantity, and the current sampling location of each rising edge is less than or equal to the preset maximum sampling position threshold, calculate the average of the current sampling locations of the two rising edges among the detected rising edges of preset quantity; Add the averaged result to the preset offset and perform the first limiting processing based on the maximum sampling position threshold; Use the result of the first limiting processing as the delay information of the rising edge.

9. The circuitry of claim 8, wherein the delay determination unit is set to perform the first limiting processing based on the maximum sampling position threshold after add the averaged result to the preset offset, comprising:

calculate the average of the current sampling locations of the two rising edges among the detected rising edges of preset quantity; When the value of average result plus the preset offset is greater than the maximum sampling position threshold, assign the value of the averaged result plus the offset value to the maximum sampling position threshold.

10. The circuitry of claim 4, wherein the delay determination unit is set to determine the delay information of the falling edge based on the determined current sampling location of the falling edge, comprising:

when the number of detected falling edges is greater than or equal to the preset quantity, and the current sampling location of each falling edge is less than or equal to the preset maximum sampling position threshold, calculate the average of the current sampling locations of the two falling edges among the detected falling edges of preset quantity; Add the averaged result to the preset offset and perform the second limiting processing based on the maximum sampling position threshold; Use the result of the second limiting processing as the delay information of the falling edge.

11. The circuitry of claim 10, wherein the delay determination unit is set to perform the second limiting processing based on the maximum sampling position threshold after add the averaged result to the preset offset, comprising:

calculate the average of the current sampling locations of the two falling edges among the detected falling edges of preset quantity; When the value of average result plus the preset offset is greater than the maximum sampling position threshold, assign the value of the averaged result plus the offset value to the maximum sampling position threshold.

12. The circuitry of claim 4, wherein the delay determination unit is set to:

before the number of detected rising edges reaches the preset quantity, when the current sampling location of the rising edge is greater than the preset maximum sampling position threshold, feedback the incorrect information in the data;

before the number of detected falling edges reaches the preset quantity, when the current sampling location of the falling edge is greater than the maximum sampling position threshold, feedback the incorrect information in the data.

13. The circuitry of any of claim 1, wherein the deskew module comprises an encoding delay controller and a delay timer;

wherein the encoding delay controller is set to generate control characters for phase offset adjustment based on the received delay information;

wherein the delay timer is set to encode the delay information based on the control characters to adjust the phase offset of the clock signal or data signal, achieving the desired phase shift;

wherein, the delay information includes delay step and total delay time.

14. The circuitry of claim 1, wherein acquire sample data obtained by sampling the data signal of the data signal lane by the clock signal of the clock signal lane with a preset duration, and determine the delay information based on the acquired sample data; and wherein adjust the phase offset of both the clock signal and the data signal based on the determined delay information.

15. A computer comprising the circuitry of claim 1, wherein the computer stores computer executable programs.

16. The circuitry of claim 1, further comprising a processor configured to execute computer programs from memory.

* * * * *